Figure 3:
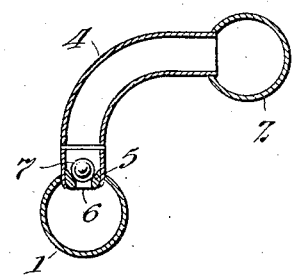

No. 855,622. PATENTED JUNE 4, 1907.
N. C. DURAND & E. L. AIKEN.
PHONOGRAPH.
APPLICATION FILED OCT. 26, 1906.

Witnesses:
Frank D. Lewis
Delos Holden

Inventors:
Nelson C. Durand and
Edward L. Aiken
By Frank L. Dyer
Atty.

UNITED STATES PATENT OFFICE.

NELSON C. DURAND, OF EAST ORANGE, AND EDWARD L. AIKEN, OF ORANGE, NEW JERSEY, ASSIGNORS TO NEW JERSEY PATENT COMPANY, OF WEST ORANGE, NEW JERSEY, A CORPORATION OF NEW JERSEY.

PHONOGRAPH.

No. 855,622.      Specification of Letters Patent.      Patented June 4, 1907.

Application filed October 26, 1906. Serial No. 340,728.

*To all whom it may concern:*

Be it known that we, NELSON C. DURAND, a citizen of the United States, residing at East Orange, county of Essex, and State of New Jersey, and EDWARD L. AIKEN, a citizen of the United States, residing at Orange, in the county of Essex and State of New Jersey, have invented certain new and useful Improvements in Phonographs, of which the following is a description.

Our invention relates to phonographs and more particularly to the sound conducting tube or tubes by which the sound waves are conveyed to the diaphragm of the recorder and from the diaphragm of the reproducer, and has been particularly designed for application to phonographs in which the recorder and reproducer are carried in a spectacle frame, as shown for instance in Edison Patent No. 386,974 dated July 31, 1888. In instruments of this character the spectacle frame is capable of assuming two positions, one in which the recorder occupies an operative position with respect to the record surface while the reproducer is in an inactive or inoperative position, and another position in which the reproducer is in an operative position and the recorder is in an inactive position.

It is desirable especially in using phonographs for commercial purposes that one should be able to shift with very little effort from recorder to reproducer and vice versa, so that it should not be necessary to detach the speaking or listening tube from the phonograph in making this change. This result has been accomplished heretofore by means shown in the patent referred to and which comprises a short tube M' carried by a support M which is independent of the pivotal movement of the spectacle frame. The speaking tube is secured to the tube M' and will be in proper position for either recording or reproducing as the movement of the spectacle frame carries the neck of the recorder or reproducer into a position just below the lower end of said tube. The structure described is objectionable, however, in that there will be a slight space or opening between the lower end of the tube M and the neck of the recorder (or reproducer), thus allowing an equalization of pressure and a consequent weakening of the sound waves which act upon the diaphragm in recording and therefore producing a fainter record than would be produced in case a continuous or unbroken air passage is provided, and furthermore in case the member M which supports the tube M' becomes slightly bent, it becomes impossible to shift the spectacle frame from one position to the other.

Our invention has for its object the provision of a sound conductor or coupling for connecting a single speaking or listening tube with both the recorder and reproducer of a phonograph when carried by a movable spectacle frame as in the patent referred to.

Reference is hereby made to the accompanying drawing of which

Figure 4:
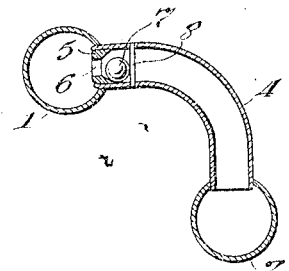
Figure 1:
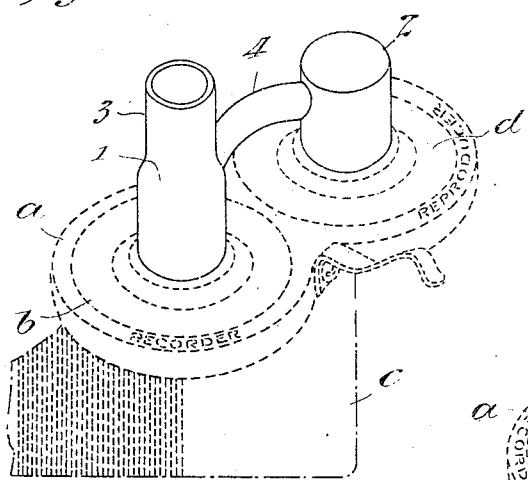
Figure 2:
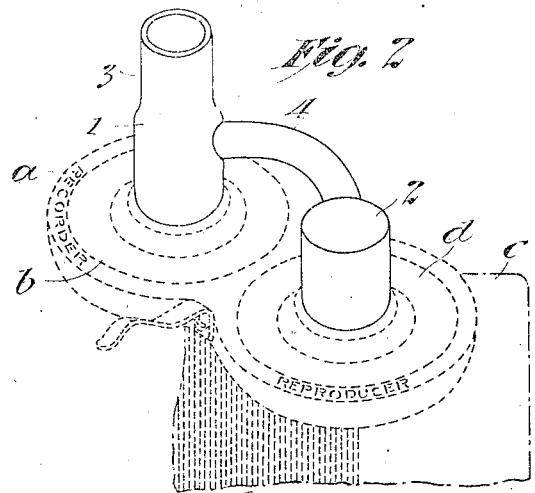

Figure 1 is a front elevation showing in full lines a coupling embodying our invention and applied to the recorder and reproducer of a spectacle frame, the latter being shown in dotted lines and being in a position in which the recorder is in operative position with respect to the record surface; Fig. 2 is a view similar to Fig. 1 except that the spectacle frame occupies a position in which the reproducer is operatively situated with respect to the record surface; Fig. 3 is a section of our improved coupling taken on a plane parallel to the plane of the spectacle frame, the parts being in the position shown in Fig. 1; Fig. 4 is a view similar to Fig. 3 of the parts when occupying the position shown in Fig. 2.

In all the views like parts are designated by the same reference numerals.

Referring to Fig. 1 the spectacle frame $a$ occupies an oblique position with the recorder $b$ directly above and in operative relation to the sound record or blank $c$ while the reproducer $d$ is in a position above and to one side of the recorder. The coupling comprises a pair of hollow or tubular members 1 and 2, the bore of which is of a size adapted to telescope upon the necks of the recorder and reproducer, making a snug fit. The tube 2 is closed at its upper end while the tube 1 may be extended upwardly forming an open-ended neck 3 as shown, upon which the ordinary speaking or listening tube may be applied by making the same of a size adapted to snugly fit over the said neck 3 which is preferably of the same outside diameter as the neck of the recorder or reproducer. The tubes 1 and 2 are connected by a curved tube 4; within this tube is a valve seat 5 formed with a port 6 adapted to be closed by a ball 7 when the parts are in the position shown in Figs. 1 and 3.

When the spectacle frame is turned into the position of Figs. 2 and 4 the reproducer will then be in suitable position for tracking the record while the recorder will be situated above and to one side of the same. In this position the ball 7 rolls off from the valve seat 5 thus opening the port 6, and a pin 8 placed across the bore of the tube 4 prevents the escape of the ball 7.

The operation of the device is as follows: When the recorder is in operative position the port 6 is closed by the ball 7, therefore the sound waves which enter the coupling through the neck 3 pass into the air chamber of the recorder without being weakened as would be the case were the port 6 open, and when the parts are in position for reproducing, the port 6 is open and the waves or vibrations set up in the air chamber of the reproducer find an unobstructed passage to the neck 3 and the listening tube. The port 6 is automatically opened and closed as the spectacle frame is shifted from one position to the other. Furthermore since the listening tube is applied to the neck 3 which is directly above the recorder, the device acts as an indicator of the position of the recorder. The user will not be likely to attempt to dictate to the phonograph when the parts are in the position of Fig. 2 because the speaking tube will lead to a point considerably above and in rear of that portion of the record surface which should be acted upon so that it will be evident to the user that he is talking to the wrong spot, whereas with the parts in the position of Fig. 1 the speaking tube will lead to a point directly above and close to the record surface, thus showing the user that the sound waves are being conducted to the proper spot. It will be obvious however, that the point of application of the speaking tube need not necessarily be an extension of the tube 1, as the valve seat 5 may be situated anywhere between the reproducer and recorder and the speaking tube applied anywhere between the recorder and valve seat the only point to be observed being that the valve be so designed as to be open when the parts are in the position of Fig. 2 and closed when in the position of Fig. 1.

Having now described our invention, what we claim as new and desire to secure by Letters Patent, is as follows:

1. In a phonograph, the combination of a frame, a recorder and reproducer carried thereby, and a coupling comprising a pair of hollow members communicating with the interiors of said recorder and reproducer and with each other, substantially as set forth.

2. In a phonograph, the combination of a frame, a recorder and reproducer carried thereby, and a coupling comprising a pair of hollow members communicating with the interiors of said recorder and reproducer, and with each other through a valved connection, substantially as set forth.

3. In a phonograph, the combination of a frame, a recorder and reproducer carried thereby, and a coupling comprising a pair of hollow members communicating with the interiors of said recorder and reproducer, and with each other through a connection having a ball valve, substantially as set forth.

4. In a phonograph, the combination of a frame, a recorder and reproducer carried thereby, and a coupling comprising a pair of tubular members applied to the necks of said recorder and reproducer and connected to each other by a curved tube having a ball valve, substantially as set forth.

5. As a new article of manufacture, a coupling comprising a pair of tubular members, a connection and a ball valve adapted to close said connection, substantially as set forth.

6. As a new article of manufacture, a coupling comprising a pair of tubular members connected by a tube, one of said members being provided with an open ended extension, substantially as set forth.

7. As a new article of manufacture, a coupling comprising a pair of tubular members connected by a valved tube, one of said members being provided with an open ended extension, substantially as set forth.

8. As a new article of manufacture, a coupling comprising a pair of tubular members connected by a tube having a ball valve, one of said members being provided with an open ended extension, substantially as set forth.

9. As a new article of manufacture, a coupling comprising a pair of tubular members adapted to fit upon the necks of a recorder and reproducer, a tube connecting said members and a valve in said tube, one of said members being provided with an open ended extension of slightly reduced diameter, substantially as set forth.

This specification signed and witnessed this 24th day of October, 1906.

NELSON C. DURAND.
EDWARD L. AIKEN.

Witnesses:
 DELOS HOLDEN,
 FRANK L. DYER.